(12) United States Patent
Gupta et al.

(10) Patent No.: US 12,498,209 B2
(45) Date of Patent: Dec. 16, 2025

(54) FOLDABLE ELECTRONIC DEVICE AND METHOD FOR DETERMINING HEALTH OF DISPLAY ASSEMBLY

(71) Applicant: Samsung Electronics Co., Ltd., Suwon-si (KR)

(72) Inventors: Gaurav Gupta, Bengaluru (IN); Mukunda Madhava Nath, Bengaluru (IN); Aloknath De, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 18/168,196

(22) Filed: Feb. 13, 2023

(65) Prior Publication Data

US 2023/0184534 A1 Jun. 15, 2023

Related U.S. Application Data

(63) Continuation of application No. PCT/KR2022/020041, filed on Dec. 9, 2022.

(30) Foreign Application Priority Data

Dec. 10, 2021 (IN) .............................. 202141057460

(51) Int. Cl.
G01B 7/16 (2006.01)
H04M 1/02 (2006.01)

(52) U.S. Cl.
CPC ............ G01B 7/22 (2013.01); H04M 1/0216 (2013.01); H04M 1/0268 (2013.01)

(58) Field of Classification Search
CPC ...... G01B 7/22; G06F 1/1652; G06N 3/0442; G06N 20/00; G09G 3/035;

(Continued)

(56) References Cited

U.S. PATENT DOCUMENTS 8,330,305 B2 12/2012 Hart et al.
9,448,660 B2 9/2016 Seo et al.
(Continued)

FOREIGN PATENT DOCUMENTS

CN 107656683 A 2/2018
KR 10-2014-0128270 A 11/2014
(Continued)

OTHER PUBLICATIONS

Indian Office Action dated Apr. 29, 2024, issued in Indian Application No. 202141057460.

(Continued)

*Primary Examiner* — Nelson M Rosario
(74) *Attorney, Agent, or Firm* — Jefferson IP Law, LLP

(57) ABSTRACT

A method for determining a health of a display assembly of a foldable electronic device is provided. The method includes detecting a sequence of folds of the display assembly of the foldable electronic device. Further, the method includes determining a first plurality of parameters associated with the sequence of folds of the display assembly. Further, the method includes determining a second plurality of parameters associated with a concentrated load on the display assembly. Further, the method includes determining a residual stress for the display assembly based on the first plurality of parameters and the second plurality of parameters. Further, the method includes determining the health of the display assembly based on the residual stress for the display assembly of the foldable electronic device.

18 Claims, 32 Drawing Sheets

(58) Field of Classification Search
CPC ......... G09G 2320/043; G09G 2354/00; G09G 2380/02; H04M 1/0214; H04M 1/0216; H04M 1/0268; H04M 1/72454; H04M 1/04

See application file for complete search history.

(56) References Cited

U.S. PATENT DOCUMENTS

| | | |
|---|---|---|
| 9,524,030 B2 | 12/2016 | Modarres et al. |
| 9,891,670 B2 | 2/2018 | Kim et al. |
| 10,043,610 B2 | 8/2018 | Sirimamilla et al. |
| 10,901,465 B2 | 1/2021 | Wu et al. |
| 2014/0028596 A1 | 1/2014 | Seo et al. |
| 2014/0035869 A1 | 2/2014 | Yun et al. |
| 2014/0320393 A1 | 10/2014 | Modarres et al. |
| 2016/0093240 A1 | 3/2016 | Aurongzeb et al. |
| 2016/0246330 A1 | 8/2016 | Kim et al. |
| 2016/0275774 A1 | 9/2016 | Bostick et al. |
| 2020/0004297 A1* | 1/2020 | Rekapalli ............. G06F 1/1618 |
| 2021/0035494 A1 | 2/2021 | Yildiz et al. |
| 2021/0096682 A1 | 4/2021 | Zhang et al. |
| 2021/0381930 A1 | 12/2021 | Kober et al. |
| 2022/0005340 A1 | 1/2022 | Han et al. |

FOREIGN PATENT DOCUMENTS

| | | |
|---|---|---|
| KR | 10-1916416 B1 | 11/2018 |
| KR | 10-2305508 B1 | 9/2021 |
| WO | 2020/093166 A1 | 5/2020 |
| WO | 2020/096324 A1 | 5/2020 |

OTHER PUBLICATIONS

International Search Report dated Mar. 20, 2023, issued in International Patent Application No. PCT/KR2022/020041.

European Search Report Oct. 15, 2024, issued in European Application No. 22904717.0.

* cited by examiner

10a

10b

10c

10d

20a

20b

20c

20d

20e

S2400

When watch is worn

Compressive stress

While in storage/charging

Tensile stress

FOLDABLE ELECTRONIC DEVICE AND METHOD FOR DETERMINING HEALTH OF DISPLAY ASSEMBLY

CROSS-REFERENCE TO RELATED APPLICATION(S)

This application is a bypass continuation of International Application No. PCT/KR2022/020041, filed on Dec. 9, 2022, which is based on and claims priority to Indian Patent Application No. 202141057460, filed on Dec. 10, 2021, in the Indian Intellectual Property Office, the disclosures of which are incorporated by reference herein in their entireties.

BACKGROUND

1. Field

The disclosure relates to a foldable electronic device. More particularly, the disclosure relates to the foldable electronic device and a method for determining a health of a display assembly of the foldable electronic device.

2. Description of Related Art

In a foldable electronic device, a display assembly may be damaged due to various mechanical loads repeated during the use of the foldable electronic device. FIG. 1A is an example scenario 10a in which a fatigue loading due to repeated fold-unfolding can damage display layers of the display assembly according to the related art. FIG. 1B is an example scenario 10b in which concentrated loading from a stylus on a fold region can damage the display assembly according to the related art. The damage may be severe in case of pen/stylus drop on the display assembly. FIG. 1C is an example scenario 10c in which pressure from a tap and touch gestures on the fold region can damage the display assembly according to the related art. FIG. 1D is an example scenario 10d in which hyperextension (flexion beyond the 180° range) of the display assembly during a foldable phone drop can introduce stress in the display according to the related art. The display damage can manifest as crease, buckling of display layers, delamination of layers, crack or fracture.

FIGS. 2A, 2B, 2C, 2D, and 2E are example scenarios (20a-20e) in which fold angle and duration variability across users of the foldable phone is depicted according to the related art. The repeated cycling will eventually lead to permanent damage as shown in FIG. 2A. FIGS. 2B and 2C illustrate the fold angle of the foldable electronic device is in the range of 0-90° and FIGS. 2D and 2E illustrate fold angle of the foldable electronic device is in the range of 90-180°.

Thus, it is desired to address the above-mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for determining a health of a display assembly of a foldable electronic device.

Another aspect of the disclosure is to determine the health of the display assembly of the foldable electronic device using an angle of each fold of a sequence of folds of the display assembly, a duration of each fold of the sequence of folds of the display assembly, a direction of each fold of the sequence of folds of the display assembly, a deformation in the thickness direction of the display assembly due to a pressure load, a level of pressure on layers of the display assembly, and a reduction in gap between layers of the display assembly due to the concentrated load so as to estimate the health of the display assembly in an accurate and reliable manner.

Additional aspects will be set forth in part in the description which follows and, in part, will be apparent from the description, or may be learned by practice of the presented embodiments.

In accordance with an aspect of the disclosure, a method for determining a health of a display assembly of a foldable electronic device is provided. The method includes detecting, by the foldable electronic device, a sequence of folds of the display assembly of the foldable electronic device. Further, the method includes determining, by the foldable electronic device, a first plurality of parameters associated with the sequence of folds of the display assembly. Further, the method includes determining, by the foldable electronic device, a second plurality of parameters associated with a concentrated load on the display assembly. Further, the method includes determining, by the foldable electronic device, a residual stress for the display assembly based on the first plurality of parameters and the second plurality of parameters. Further, the method includes determining, by the foldable electronic device, the health of the display assembly based on the residual stress for the display assembly of the foldable electronic device. Further, the method includes displaying, by the foldable electronic device, the health of the display assembly on the foldable electronic device.

In an embodiment, the first plurality of parameters includes an angle of each fold of the sequence of folds of the display assembly, a duration of each fold of the sequence of folds of the display assembly, and a direction of each fold of the sequence of folds of the display assembly. The second plurality of parameters includes a level of deformation in the thickness direction of the display assembly, a level of pressure on layers of the display assembly, and a reduction in gap between layers of the display assembly due to the concentrated load.

In an embodiment, the level of deformation in the thickness direction of the display assembly is determined by determining a pressure load on the display assembly, and determining the level of deformation in the thickness direction of the display assembly based on the pressure load.

In an embodiment, the pressure load is one of a static pressure and a dynamic pressure, wherein the static pressure is caused due to a pressure from a stylus or a touch, and wherein the dynamic pressure caused from at least one of a gesture performed on the display assembly and an impact loading due to an object drop or external impact on the display assembly.

In an embodiment, the residual stress for the display assembly is determined by applying at least one machine learning model on the plurality of parameters associated with the sequence of folds and the plurality of parameters associated with a concentrated load on the display assembly.

In an embodiment, the method comprises training, by the foldable electronic device, the machine learning model by obtaining a sequence of folds and the concentrated load on the display assembly by a user of the foldable electronic device, determining the plurality of parameters of the display assembly of the sequence of folds and the plurality of parameters associated with the concentrated load on the display assembly by the user, and training the machine learning model using the plurality of parameters of the display assembly of the sequence of folds and the concentrated load.

The machine-learning model is trained with data collected from specific long-term usage scenarios through controlled lab experiments and computer simulation models. The different usage scenarios will be a combination of different fold angles and duration of folds. Usage scenario would also include different extent of pressure load applied at different locations over time. The training data can also include data collected from real users over the course of usage of their device. The residual stress response for each of the training instance may be measured experimentally using stress/strain measurement sensors or predicted from an accurate computer simulation model.

In an embodiment, the angle of the sequence of folds of the display assembly is determined using at least one of an inertial measurement unit (IMU) sensor, a flex sensor, and a Hall sensor.

In an embodiment, determining the level of the deformation in the thickness direction of the display assembly includes measuring a deflection of the display assembly based on at least one of a finger touch, a stylus, and an object drop using at least one capacitance sensor placed in a fold region of the foldable electronic device, and detecting an area of the deflection of the display assembly and a duration of the deflection of the display assembly based on the deflection of the display assembly.

In accordance with another aspect of the disclosure, a foldable electronic device for determining a health of a display assembly of a foldable electronic device is provided. The foldable electronic device includes a display assembly and a memory storing folding information of the display assembly. A processor is connected to the memory. A health status controller is connected to the memory and the processor. The health status controller is configured to detect a sequence of folds of the display assembly of the foldable electronic device and determine a first plurality of parameters associated with the sequence of folds of the display assembly. The health status controller is configured to determine a second plurality of parameters associated with a concentrated load on the display assembly. The health status controller is configured to determine a residual stress for the display assembly based on the first plurality of parameters and the second plurality of parameters. The health status controller is configured to determine the health of the display assembly based on the residual stress for the display assembly of the foldable electronic device. The health status controller is configured to display the health of the display assembly on the foldable electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
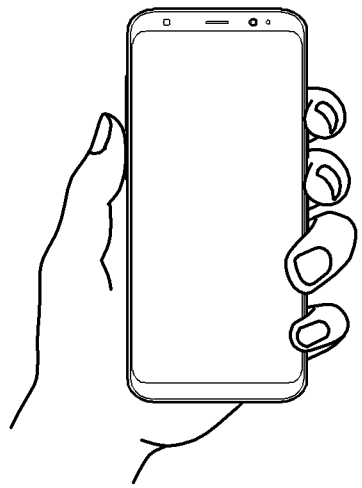
FIG. 1A is an example scenario in which a fatigue loading due to repeated fold-unfolding damages display layers of a display assembly, according to the related art.
Figure 1B:
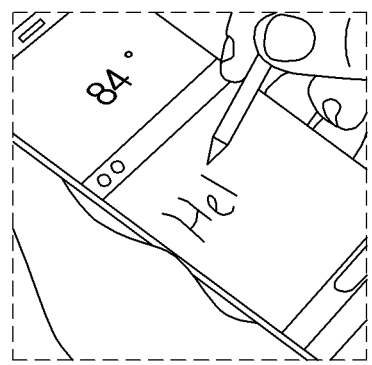
FIG. 1B is an example scenario in which concentrated loading from a stylus on a fold region damages a display assembly, according to the related art.
Figure 1C:
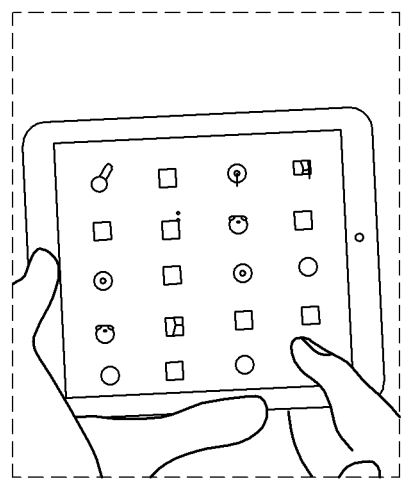
FIG. 1C is an example scenario in which pressure from a tap and touch gestures on a fold region can damage a display assembly, according to the related art.
Figure 1D:
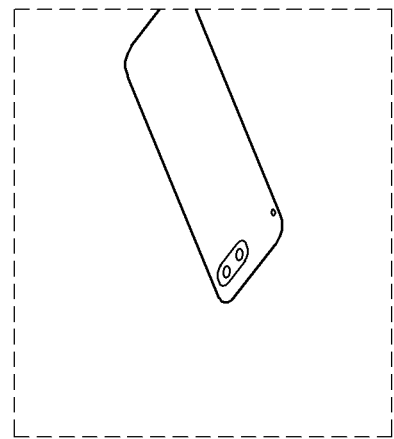
FIG. 1D is an example scenario in which hyperextension (i.e., flexion beyond a 180° range) of a display assembly during a foldable phone drop can introduce stress in the display assembly, according to the related art.
Figure 2A:
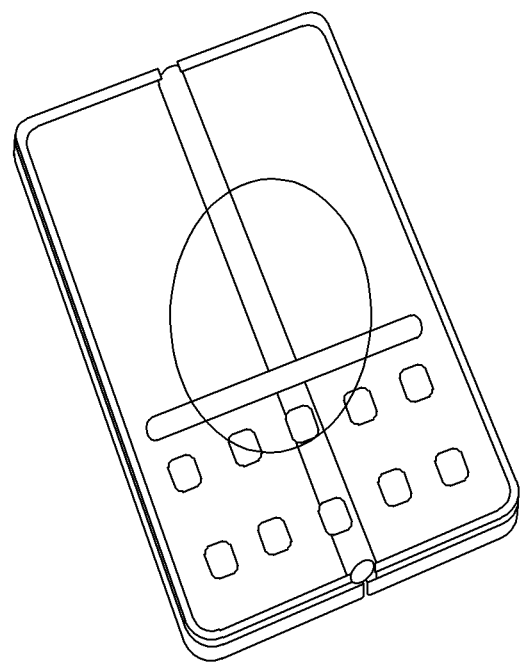
FIGS. 2A, 2B, 2C, 2D, and 2E are example scenarios in which a fold angle and a duration variability across users of a foldable phone is depicted, according to related arts.
Figure 2B:
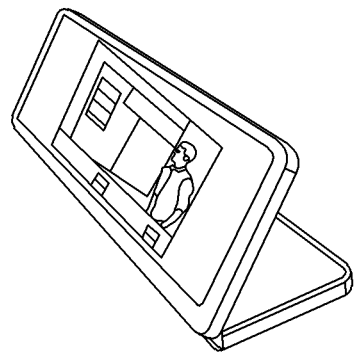
Figure 2C:
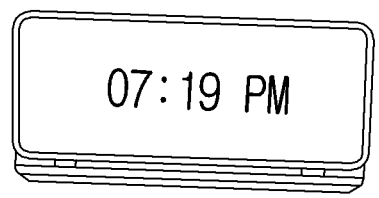
Figure 2D:
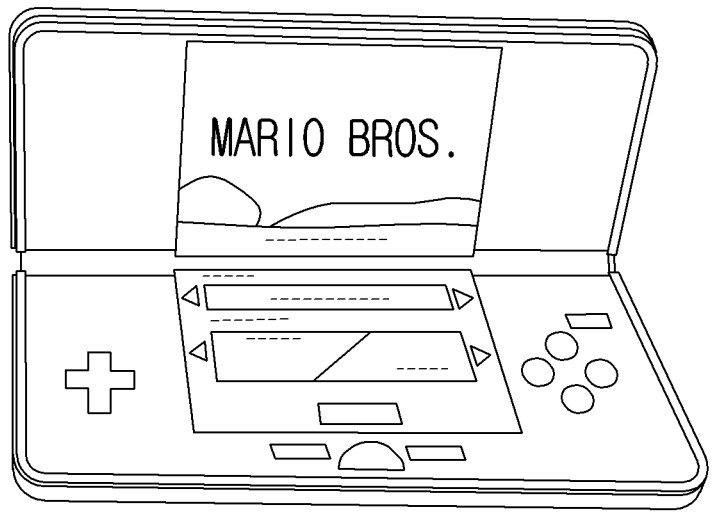
Figure 2E:
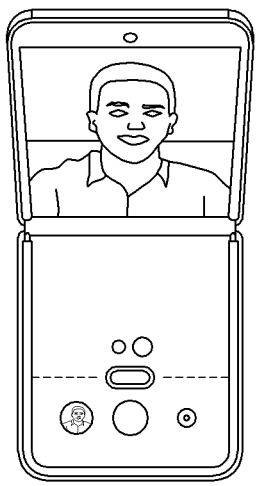

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for determining a health of a display assembly of a foldable electronic device. The method includes detecting, by the foldable electronic device, a sequence of folds of the display assembly of the foldable electronic device. Further, the method includes determining, by the foldable electronic device, a first plurality of parameters associated with the sequence of folds of the display assembly. Further, the method includes determining, by the foldable electronic device, a second plurality of parameters associated with a concentrated load on the display assembly. Further, the method includes determining, by the foldable electronic device, a residual stress for the display assembly based on the first plurality of parameters and the second plurality of parameters. Further, the method includes determining, by the foldable electronic device, the health of the display assembly based on the residual stress for the display assembly of the foldable electronic device. Further, the method includes displaying, by the foldable electronic device, the health of the display assembly on the foldable electronic device.

The proposed method may be used to determine the health of the display assembly of the foldable electronic device using an angle of each fold of a sequence of folds of the display assembly, a duration of each fold of the sequence of folds of the display assembly, a direction of each fold of the sequence of folds of the display assembly, a deformation in the thickness direction of the display assembly due to a pressure load, a level of pressure on layers of the display assembly, and a reduction in gap between layers of the display assembly due to the concentrated load, so as to estimate the health of the display assembly in an accurate and reliable manner.

Referring now to the drawings and more particularly to FIGS. 3, 4, 5A, 5B, and 6 to 24, where similar reference characters denote corresponding features consistently throughout the figures, there are shown preferred embodiments.

Figure 3:
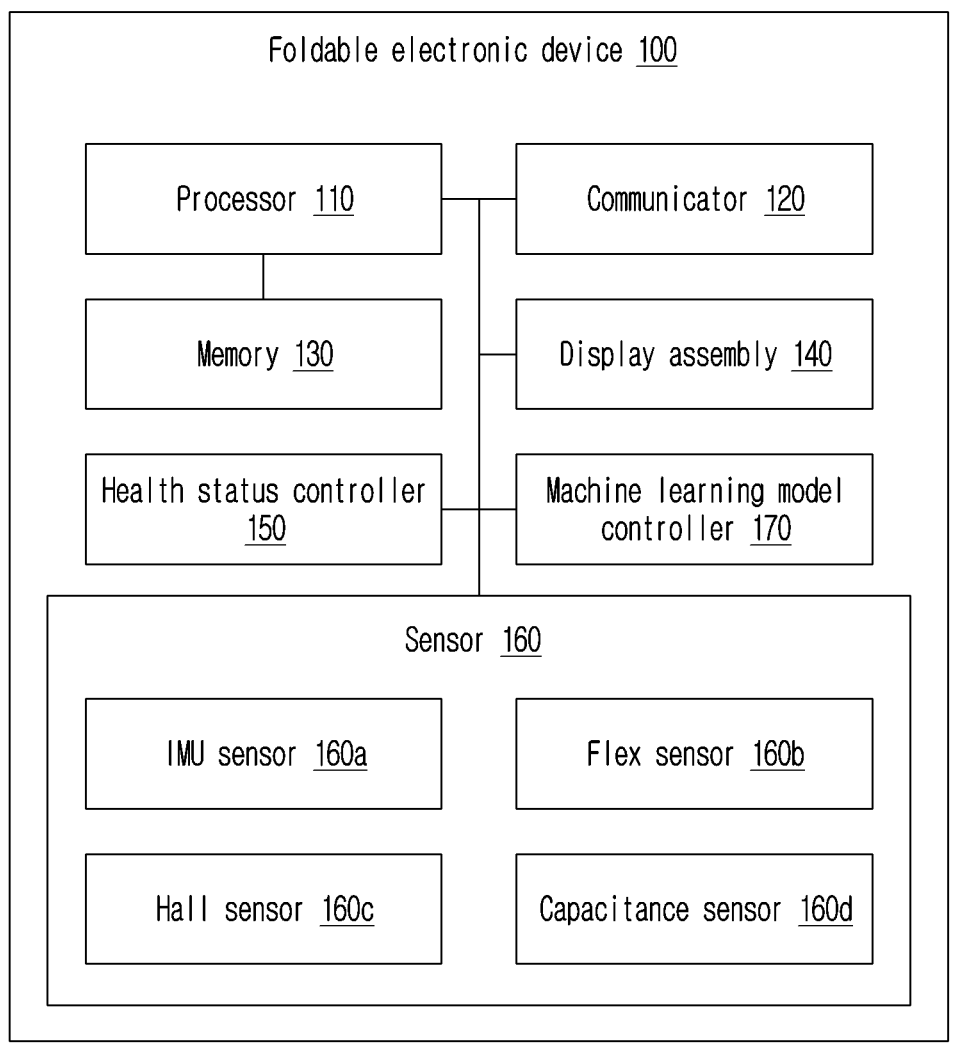
FIG. 3 shows various hardware components of a foldable electronic device for determining health of a display assembly, according to an embodiment of the disclosure.

FIG. 3 shows various hardware components of a foldable electronic device for determining health of a display assembly, according to an embodiment of the disclosure.

The foldable electronic device 100 may be, for example, but not limited to a foldable smart phone, a foldable watch, a foldable internet of things (IoT) device, a foldable immersive device, and a foldable virtual reality device, a foldable tablet, and a foldable television (TV). The foldable electronic device 100 includes a processor 110, a communicator 120, a memory 130, a display assembly 140, a health status controller 150, a sensor 160 and a machine learning model controller 170. The memory 130 stores information of a plurality of states of the display assembly 140. The processor 110 is connected to the memory 130, the communicator 120, the display assembly 140, the health status controller 150, the sensor 160 and the machine learning model controller 170. The sensor 160 may be, for example, but not limited to an IMU sensor 160a, a flex sensor 160b, a Hall sensor 160c and a capacitance sensor 160d.

In an embodiment, the health status controller 150 is configured to detect a sequence of folds of the display assembly 140 of the foldable electronic device 100 and determine a first plurality of parameters associated with the sequence of folds of the display assembly 140. The first plurality of parameters associated with the display assembly 140 may be, for example, but not limited to an angle of the sequence of folds of the display assembly 140, a duration of the sequence of folds of the display assembly 140, and a direction of the sequence of folds of the display assembly 140. In an example, the IMU sensor 160a, the flex sensor 160b, and the Hall sensor 160c are used to determine the angle of the sequence of folds of the display assembly 140.

The capacitance sensor 160d is configured to measure a deflection of the display assembly 140 based on a finger touch, a stylus, and an object drop. Further, the capacitance sensor 160d is configured to detect the area of the deflection of the display assembly 140 and a duration of the deflection of the display assembly 140 based on the deflection of the display assembly 140.

The health status controller 150 is configured to determine a second plurality of parameters associated with a concentrated load on the display assembly 140. The second plurality of parameters may be, for example, but not limited to a level of deformation in the thickness direction of the display assembly 140, a level of pressure on layers of the display assembly 140, and a reduction in gap between layers of the display assembly 140 due to the concentrated load. The pressure load is one of a static pressure and a dynamic pressure, where the static pressure is caused due to a pressure from a stylus or a touch, and the dynamic pressure caused from the gesture performed on the display assembly 140 and an impact loading due to an object drop on the display assembly 140. Based on the pressure load, the health status controller 150 is configured to determine the level of deformation in the thickness direction of the display assembly 140.

The health status controller 150 is configured to determine a residual stress for the display assembly 140 based on the first plurality of parameters and the second plurality of parameters. The residual stress for the display assembly 140 is determined by applying a machine learning model on the plurality of parameters associated with the sequence of folds and the plurality of parameters associated with the concentrated load on the display assembly 140) using the machine learning model controller 170. The machine learning model is trained by obtaining a sequence of folds and the concentrated load on the display assembly 140 by a user of the foldable electronic device 100, determining the plurality of parameters of the display assembly 140 of the sequence of folds and the concentrated load on the display assembly 140 by the user, and training the machine learning model using the plurality of parameters of the display assembly 140 of the sequence of folds and the concentrated load.

The health status controller 150 is configured to determine the health of the display assembly 140 based on the residual stress for the display assembly 140 of the foldable electronic device 100. The health status controller 150 is configured to display the health of the display assembly 140 on the foldable electronic device 100. The health status controller 150 is configured to recommend the user of the foldable electronic device 100 (the example recommendation related use case is captured in FIGS. 16 to 24).

Further, the processor 110 is configured to execute instructions stored in the memory 130 and to perform various processes. The communicator 120 is configured for communicating internally between internal hardware components and with external devices via one or more networks. The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in Random Access Memory (RAM) or cache).

Further, at least one of the plurality of modules/controller may be implemented through the artificial intelligence (AI) model. A function associated with the AI model may be performed through the non-volatile memory, the volatile memory, and the processor 110. The processor 110 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 3 shows various hardware components of the foldable electronic device 100 but it is to be understood that other embodiments are not limited thereon. In other embodiments, the foldable electronic device 100 may include a lesser or greater number of components. Further, the labels or names of the components are used only for illustrative purpose and does not limit the scope of the disclosure. One or more components may be combined together to perform same or substantially similar function in the foldable electronic device 100.

Figure 4:
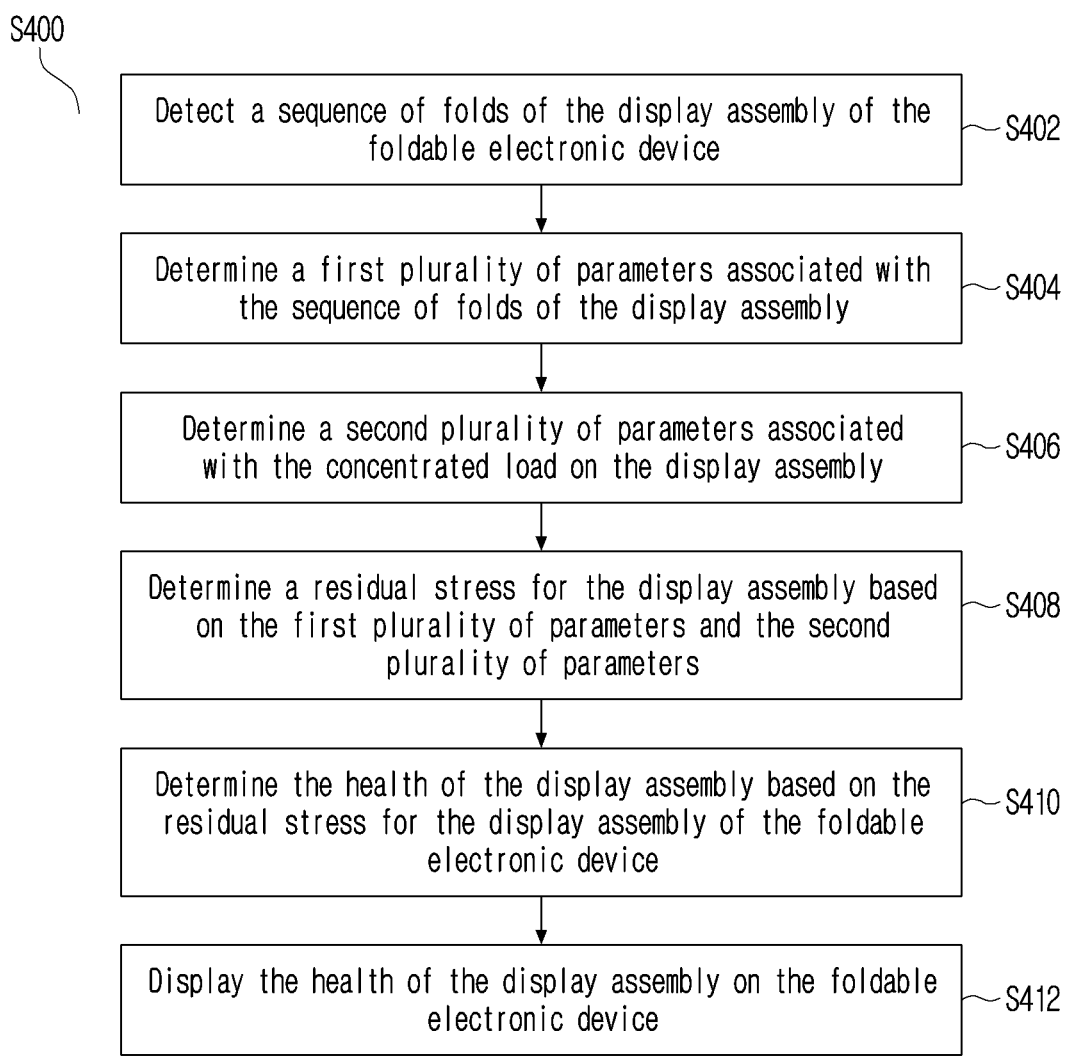
FIG. 4 is a flow chart illustrating a method for determining health of a display assembly of a foldable electronic device, according to an embodiment of the disclosure.

FIG. 4 is a flow chart illustrating a method for determining the health of the display assembly of the foldable electronic device, according to an embodiment of the disclosure. The operations (S402-S412 are performed by the health status controller 150.

Referring to FIG. 4, in a method S400, at operation S402, the method includes detecting the sequence of folds of the display assembly 140 of the foldable electronic device 100. At operation S404, the method includes determining the first plurality of parameters associated with the sequence of folds of the display assembly 140. At operation S406, the method includes determining the second plurality of parameters associated with a concentrated load on the display assembly 140.

At operation S408, the method includes determining the residual stress for the display assembly 140 based on the first plurality of parameters and the second plurality of parameters. At operation S410, the method includes determining the health of the display assembly 140 based on the residual stress for the display assembly 140 of the foldable electronic device 100. At operation S412, the method includes displaying the health of the display assembly 140 on the foldable electronic device 100.

The proposed method may be used to determine the health of the display assembly of the foldable electronic device 100 using the angle of each fold of the sequence of folds of the display assembly 140, the duration of each fold of the sequence of folds of the display assembly 140, the direction of each fold of the sequence of folds of the display assembly 140, the deformation in the thickness direction of the display assembly 140 due to the pressure load, the level of pressure on layers of the display assembly 140, and the reduction in gap between layers of the display assembly 140 due to the concentrated load so as to estimate the health of the display assembly 140 in an accurate and reliable manner.

The various actions, acts, blocks, steps, or the like in the method S400 may be performed in the order presented, in a different order or simultaneously. Further, in some embodiments, some of the actions, acts, blocks, steps, or the like may be omitted, added, modified, skipped, or the like without departing from the scope of the disclosure.

Figure 5A:
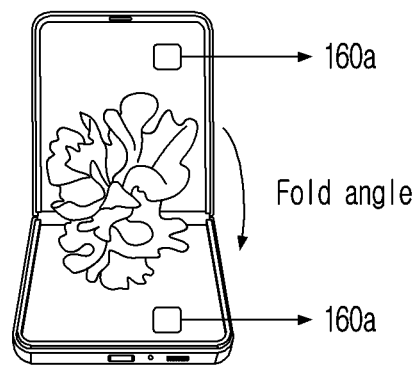
FIGS. 5A and 5B are example scenarios in which determining a fold angle using two IMU sensors or flex sensors are depicted, according to various embodiments of the disclosure.
Figure 5B:
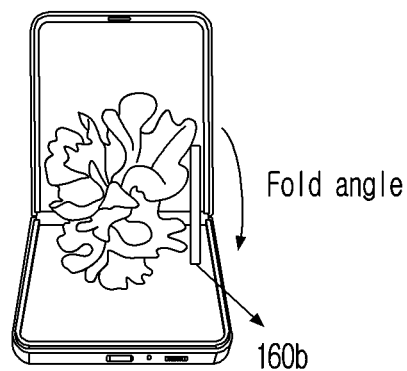

FIGS. 5A and 5B are example scenarios in which determining z fold angle using two IMU sensors or the flex sensors are depicted, according to various embodiments of the disclosure.

Referring to FIGS. 5A and 5B, the IMU sensors 160a) and the capacitive sensor 160d or addition of sensors (i.e., flex sensors 160b, pressure sensors) are used to measure device usage. The Hall sensor 160c may also be used for fold angle estimation. In repeated folding, fold angle and duration is a measure of the cumulative damage.

Figure 6:
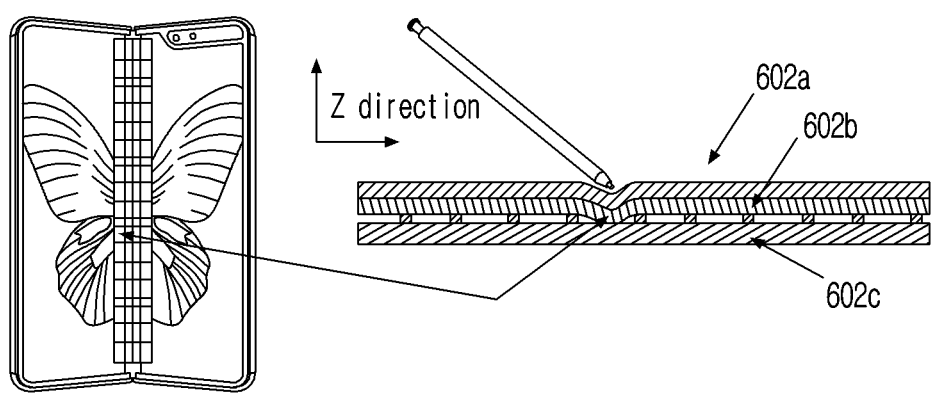
FIG. 6 is an example scenario in which determining localized deformation using under display sensors is depicted, according to an embodiment of the disclosure.

FIG. 6 is an example scenario in which determining localized deformation using under display sensors is depicted, according to an embodiment of the disclosure. The capacitive sensors or the pressure sensors are used to measure display deformation.

Referring to FIG. 6, the sensor 160 placed only in fold region (display layers 602a, 602b and 602c). The sensor 160 measures deflection of display due to finger touch or stylus and the area of deflection and duration is a measure of damage of the display assembly.

Figure 7:
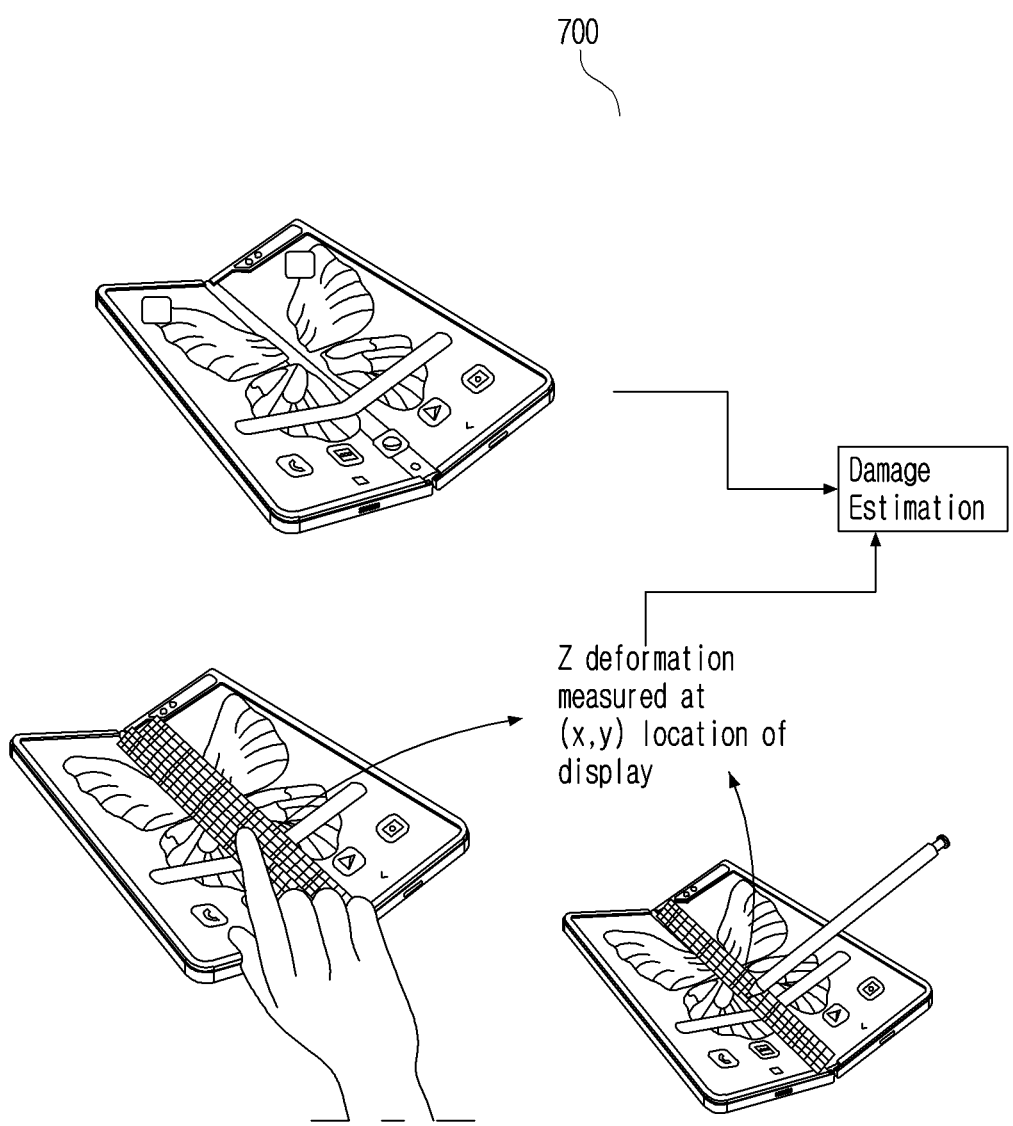
FIG. 7 is an example scenario in which the foldable electronic device determines a health of display assembly using various parameters, according to an embodiment of the disclosure.

FIG. 7 is an example scenario in which a foldable electronic device determines a health of a display assembly using various parameters, according to an embodiment of the disclosure.

Referring to FIG. 7, in an example scenario 700, the health status controller 150 is configured to detect a sequence of folds of the display assembly 140 of the foldable electronic device 100 and determine the plurality of parameters associated with the sequence of folds of the display assembly 140. The plurality of parameters associated with the display assembly 140 may be, for example, but not limited to an angle of the sequence of folds of the display assembly 140, a duration of the sequence of folds of the display assembly 140, a direction of the sequence of folds of the display assembly 140, and a deformation in a thickness direction of the display assembly 140 due to a pressure load.

Further, the health status controller 150 is configured to determine the level of deformation in the thickness direction of the display assembly 140 and determine a residual stress for the display assembly based on the plurality of parameters associated with the sequence of folds of the display assembly and the level of the deformation in the thickness of the display assembly. The health status controller 150 is configured to determine the health of the display assembly 140 based on the residual stress for the display assembly of the foldable electronic device 100.

Figure 8:
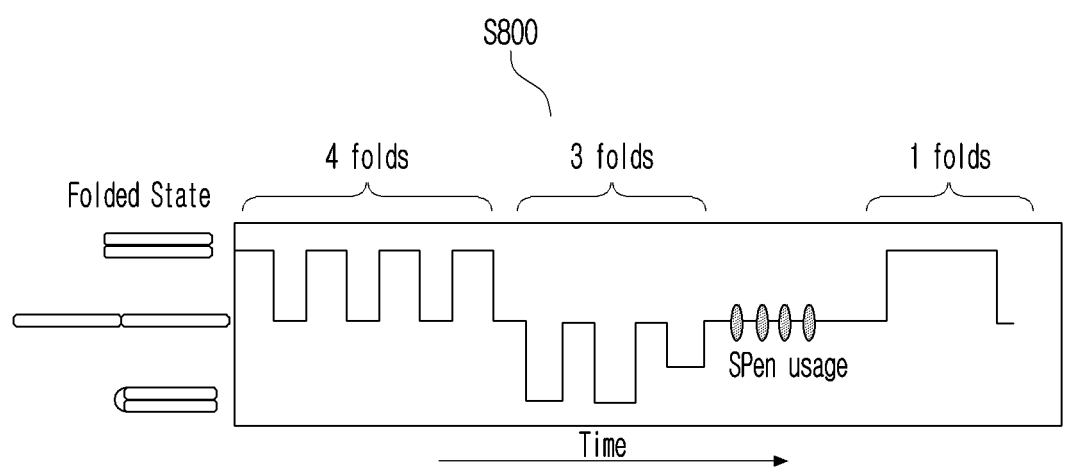
FIG. 8 is an example scenario in which a foldable electronic device going through a sequence of fold operations over time is depicted, according to the related art.

FIG. 8 is an example scenario in which a foldable electronic device performing the sequence of fold operations over time is depicted, according to the related art.

Referring to FIG. 8, in an example scenario S800, the foldable electronic device 100 that may be folded inwards and outwards. In this example, the foldable electronic device 100 is folded and unfolded in the inward direction four times followed by 3 times folding and unfolding in the reverse direction. In the existing method, the display health is measured based on the total number of folds and total duration of fold. The existing method does not consider the direction of fold, angle of fold and the duration of each fold for measuring the display health. The figure indicates that the user has used the SPen after repeated folding and it can create pressure load in specific locations. Existing solution does not consider damage due to such concentrated load.

Figure 9:
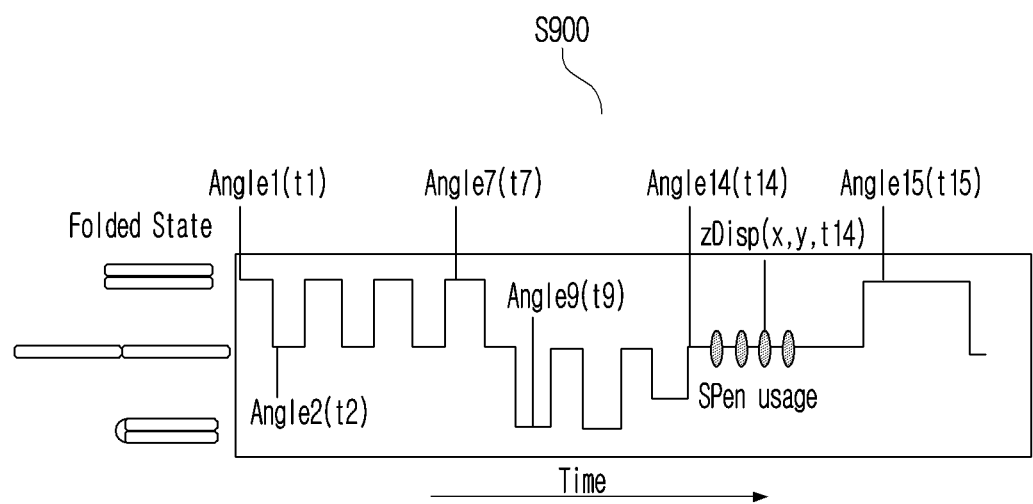
FIG. 9 is an example scenario in which a foldable electronic device going through a sequence of fold operations over time is depicted, according to an embodiment of the disclosure.

FIG. 9 is an example scenario in which a foldable electronic device performing a sequence of fold operations over time is depicted, according to an embodiment of the disclosure.

Referring to FIG. 9, in an example scenario S900, a foldable electronic device 100 that may be folded inwards and outwards. In this example, the foldable electronic device 100 is folded and unfolded in the inward direction four times followed by 3 times folding and unfolding in the reverse direction. Further, the user uses the SPen that might create pressure load in specific locations (x,y) of the display. Based on the proposed method, the angle of fold, the direction of fold, the duration of fold and concentrated load (static or dynamic loading) are used for display health estimation.

Figure 10:
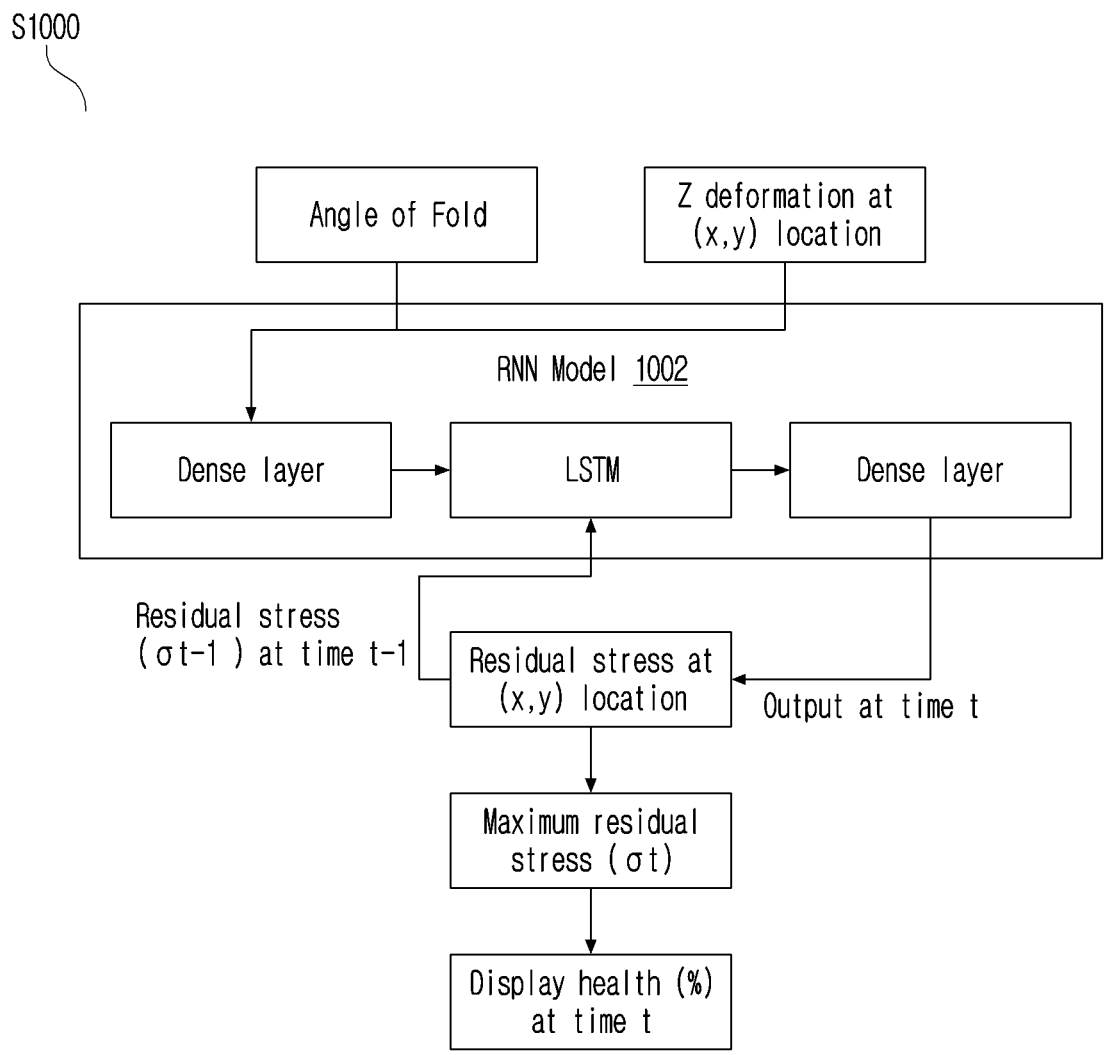
FIG. 10 is an example scenario in which a recurrent neural network (RNN) model is used for display health estimation, according to an embodiment of the disclosure.

FIG. 10 is an example scenario in which a RNN model is used for display health estimation, according to an embodiment of the disclosure.

Referring to FIG. 10, in an example scenario S1000, the RNN model 1002 is trained by obtaining the sequence of folds and the deformation in the thickness direction of the display assembly 140 by a user of the foldable electronic device 100. Inputs to the model may be the plurality of parameters of the display assembly 140 of the sequence of folds at a given time 't' and the deformation in the thickness direction of the display assembly 140 by the user at time 't'. The response of the RNN model is the residual stress at different locations (x,y).

As shown, the input (e.g., fold angle and deformation at (x,y) location at any time 't') is provided as input to the RNN model. The RNN model may be LSTM 1006 or any other architecture. Further, the RNN model computes the residual stress at time 't' as a function of (x,y) location. The residual stress is the cumulative effect of the history of fold sequence and pressure load therefore the residual stress at 't−Δt' is also given as an input to the LSTM to compute stress at time 't'. Further, the RNN model computes the maximum residual stress (at) at time 't' which determines the effective health of the display. The RNN model is invoked at Δt intervals or whenever there is a change in the fold sensor or pressure sensor measurement.

Figure 11:
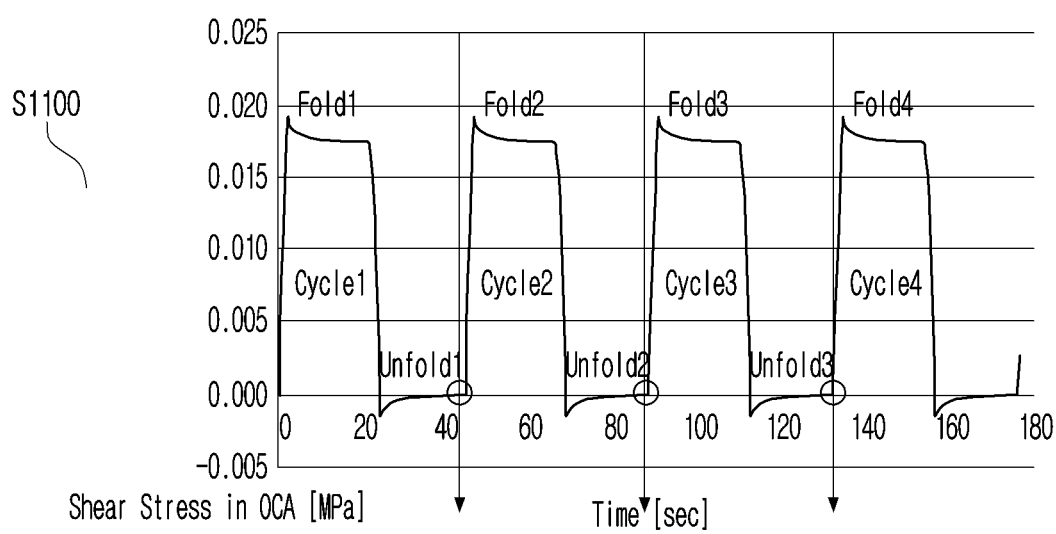
FIG. 11 is an example scenario in which simulation prediction of residual stresses for four cycles of folding and unfolding with a short unfolded duration is depicted, according to an embodiment of the disclosure.

FIG. 11 is an example scenario in which simulation prediction of a residual stress for four cycles of folding and unfolding with a short unfolded duration is depicted, according to an embodiment of the disclosure.

Referring to FIG. 11, in an example scenario S1100, the residual stress (3×10−6 MPa) adds up after each fold cycle. If cycled repeatedly, the residual stress after 100,000 cycles would be 0.5 MPa. Hence, very high and can lead to delamination of the display layers among other failure modes (602a-602c).

Figure 12:
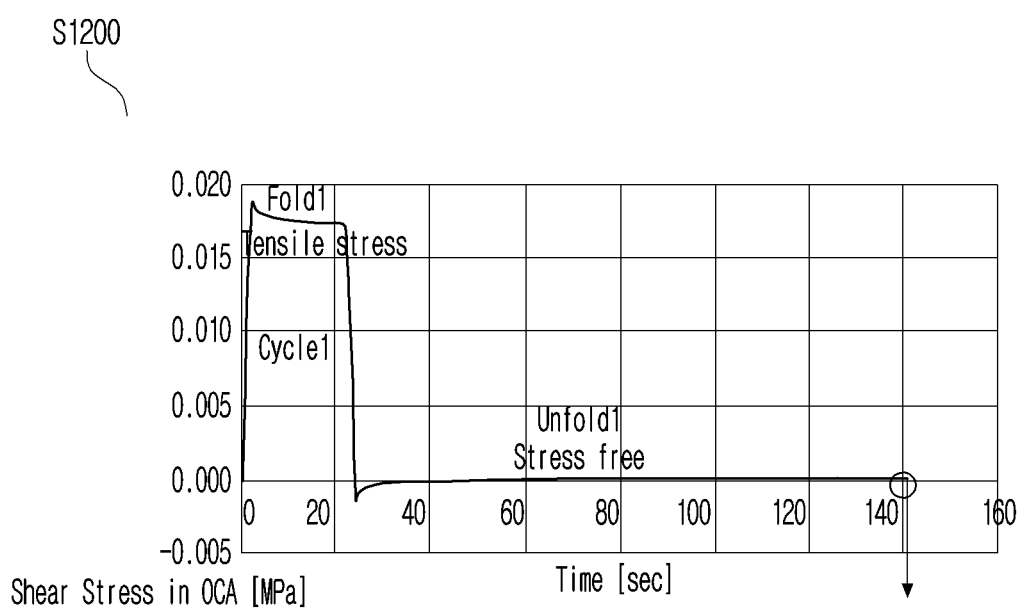
FIG. 12 is an example scenario in which simulation prediction of residual stresses for a single fold and an unfold cycle with a longer unfolded duration is depicted, according to an embodiment of the disclosure.

FIG. 12 is an example scenario in which simulation prediction of the residual stress for a single fold and unfold cycle with a longer unfolded duration is depicted, according to an embodiment of the disclosure.

Referring to FIG. 12, in an example scenario S1200, residual stress gradually drops to zero (−10-10) when unfold duration is long. There is lower risk of failure to the display layers.

Figure 13:
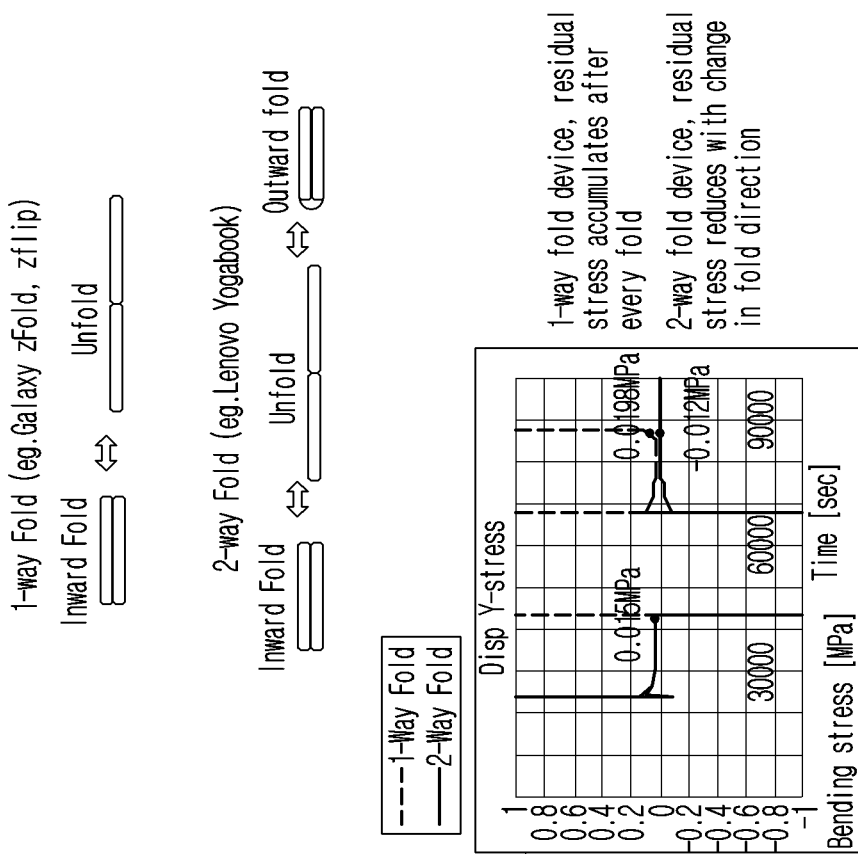
FIG. 13 is an example scenario in which simulation prediction of residual stress for different fold directions is depicted, according to an embodiment of the disclosure.
Figure 13:
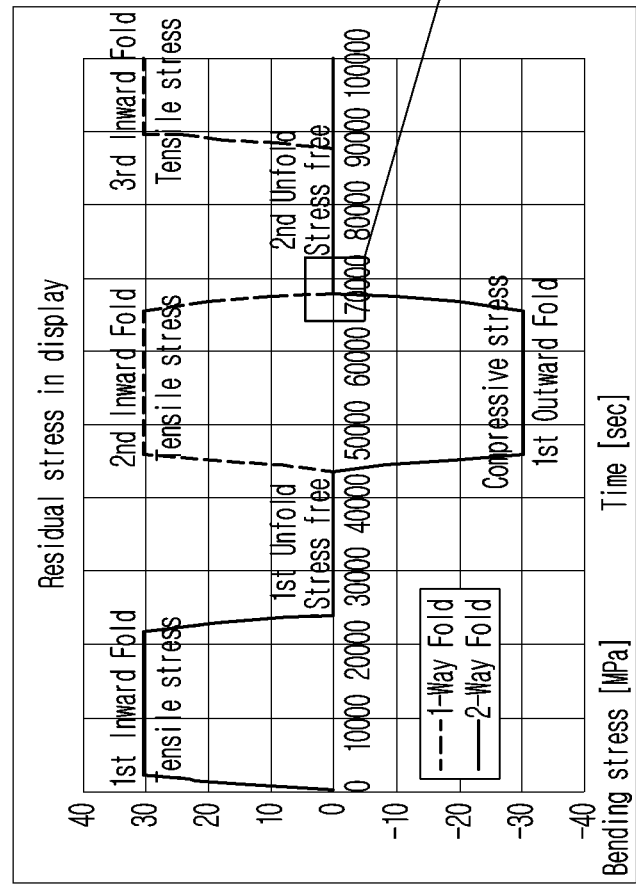

FIG. 13 is an example scenario in which simulation prediction of residual stress for different fold directions is depicted, according to an embodiment of the disclosure. A 1-way foldable device is one that can only fold within 0-180°. A 2-way foldable device is one that may fold within 0-360°.

Referring to FIG. 13, in an example scenario S1300, in a 1-way fold device, residual stress accumulates after every fold and for the 2-way fold device, residual stress reduces with the change in fold direction.

Figure 14:
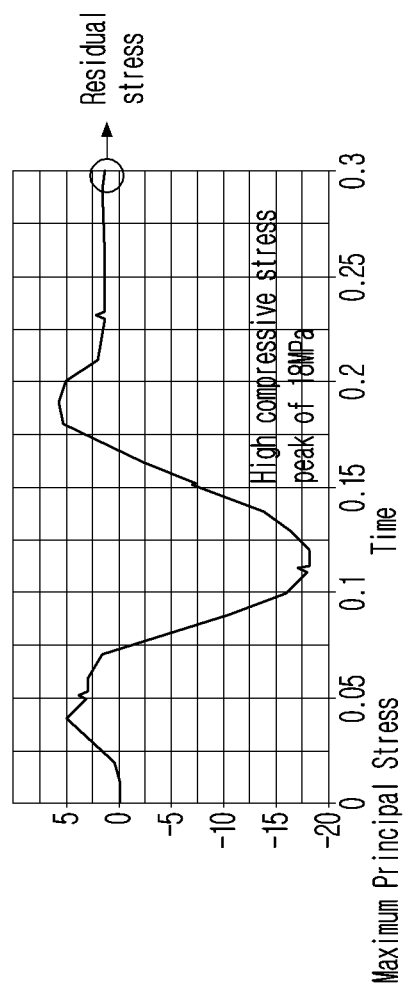
FIG. 14 is an example scenario in which simulation analysis for a residual stress due to concentrated load is done using a ball drop test, and the residual stress even after completion of a drop event is plotted according to an embodiment of the disclosure.
Figure 14:
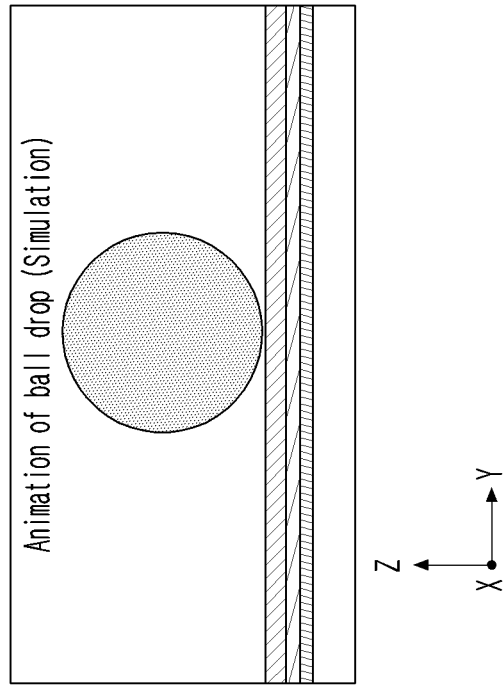

FIG. 14 is an example scenario in which simulation analysis for residual stress due to concentrated load is done using a ball drop test, and the residual stress even after completion of a drop event is plotted according to an embodiment of the disclosure.

Referring to FIG. 14, in an example scenario S1400, the ball drop simulation is the worst case scenario for concentrated loading due to S-Pen or touch gesture. The figure shows the high stresses in the display layer during the ball drop event that leads to residual stresses due to permanent damage and viscoelastic behavior of display layers. Impact load is a concern in the display's fold region as it can cause permanent damage or accelerate the damage during subsequent folding load.

Figure 15:
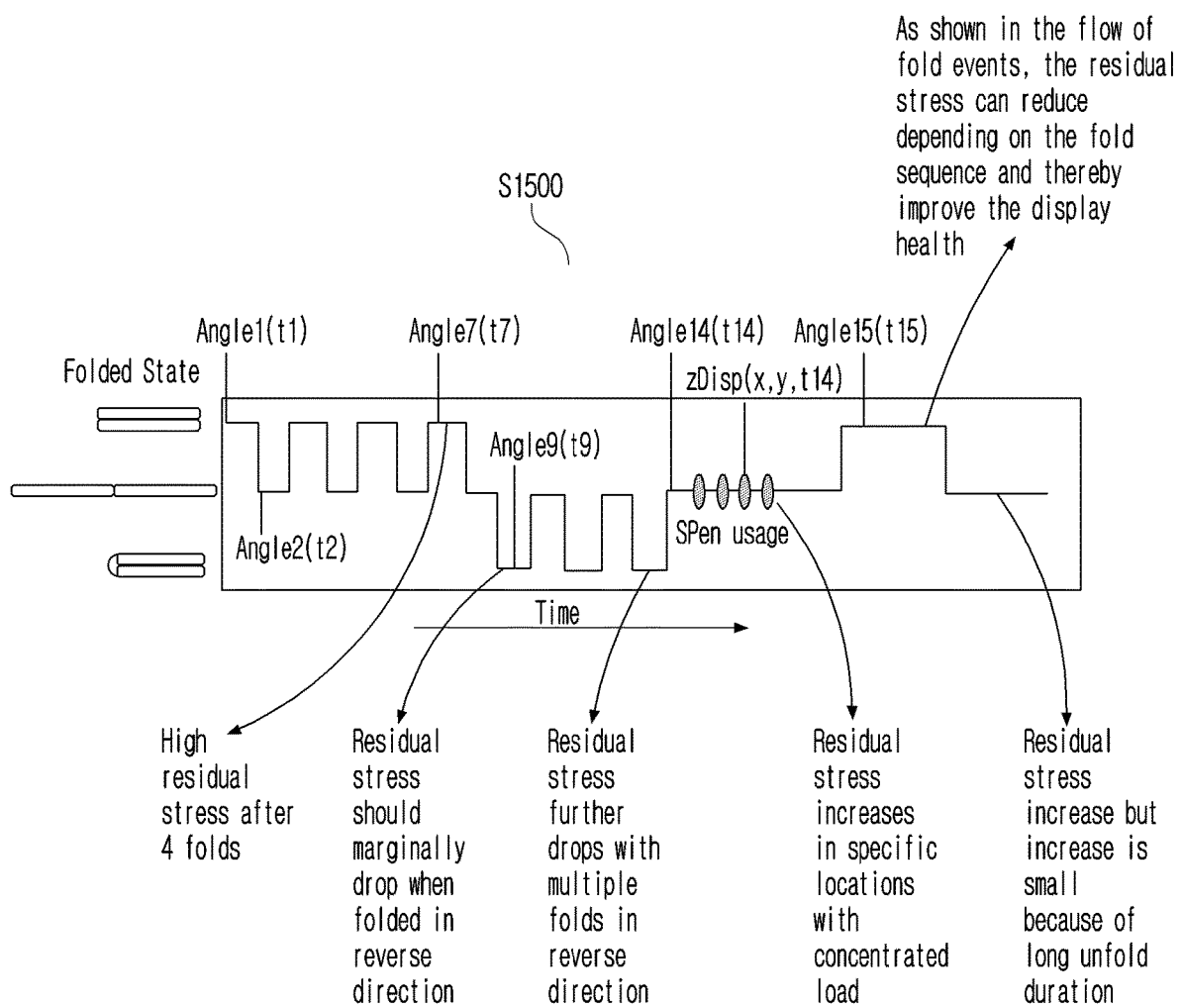
FIG. 15 is an example scenario in which variation of residual stress due to repeated folding and concentrated load usage is depicted for a typical usage scenario, according to FIG. 16 is an example flow chart illustrating a method for recommending a user of a foldable electronic device, according to an embodiment of the disclosure.

FIG. 15 is an example scenario in which variation of residual stress due to repeated folding and concentrated load usage is depicted for a typical usage scenario, according to an embodiment of the disclosure.

Referring to FIG. 15, in an example scenario S1500, the 2-way folding device is first folded inwards 4 times and then folded outwards 3 times. The residual stress should drop after the outward folds. This is followed by concentrated pressure load due to S-Pen usage, which causes residual stress at specific (x,y) locations. One last fold and unfold sequence with a large wait time gradually eases the residual stress and improves the display health.

Figure 16:
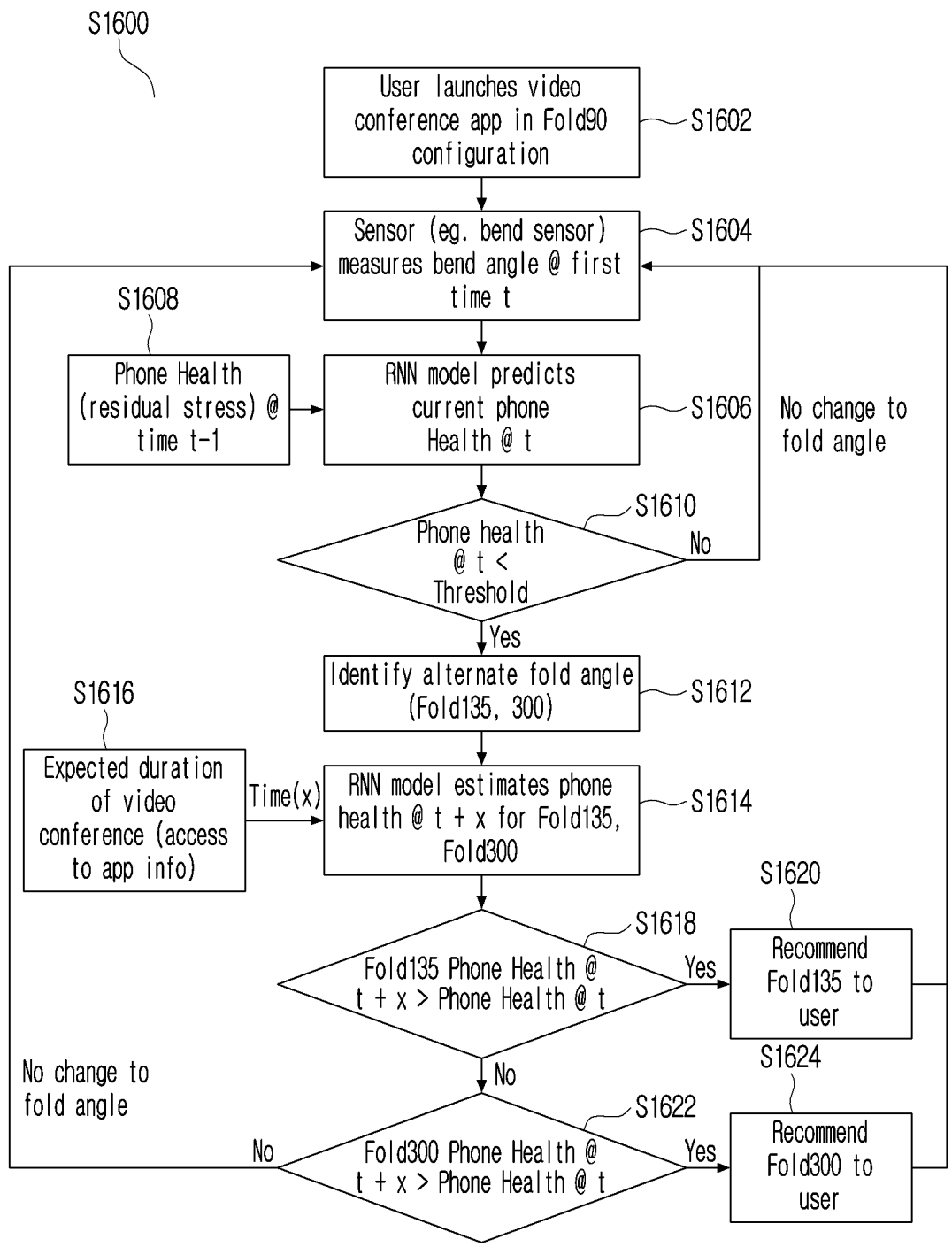

FIG. 16 is an example flow chart illustrating a method for recommending a user of a foldable electronic device, according to an embodiment of the disclosure.

Referring to FIG. 16, in a method S1600, at operation S1602, the user of the foldable electronic device 100 launches the video conference application in the Fold90 configuration. At operation S1604, the sensor 160 (e.g., bend sensor or the like) measures the bend angle of the foldable electronic device 100 at a first time (t). At operation S1608, the foldable electronic device 100 obtains the phone health (i.e., residual stress) at a second time (t−1). At operation S1606, the RNN model predicts current phone health at the first time (t). At operation S1610, the foldable electronic device 100 determines whether the phone health at the first time is less than the threshold. The threshold is set by the user or the foldable electronic device 100. If the phone health at the first time is greater than the threshold then, the method performs the operation of S1604.

If the phone health at the first time is less than the threshold than, at operation S1612, the foldable electronic device 100 identifies alternate fold angle (e.g., Fold135 (not shown), 300). At operation S1614, the RNN model estimates phone health at the third time (i.e., t+x) for Fold135, Fold300. At operation S1616, the foldable electronic device 100 computes the expected duration of video conference (access to app information). At operation S1618, the foldable electronic device 100 determines whether the fold135 Phone Health at the third time>the phone Health at the first time. If the fold135 Phone Health at the third time>the phone Health at the first time then, at operation S1620, foldable electronic device 100 recommends the Fold135 to user. If the fold135 Phone Health at the third time<the phone Health at the first time then, at operation S1622, foldable electronic device 100 determines whether the Fold300 Phone Health at the third time>Phone Health at the first time. If the Fold300 Phone Health at the third time>Phone Health at the first time then, at operation S1624, the foldable electronic device 100 recommends the Fold300 to the user. If the Fold300 Phone Health at the third time<Phone Health at the first time then, at operation S1624, the foldable electronic device 100 performs the operation of S1604.

Figure 17:
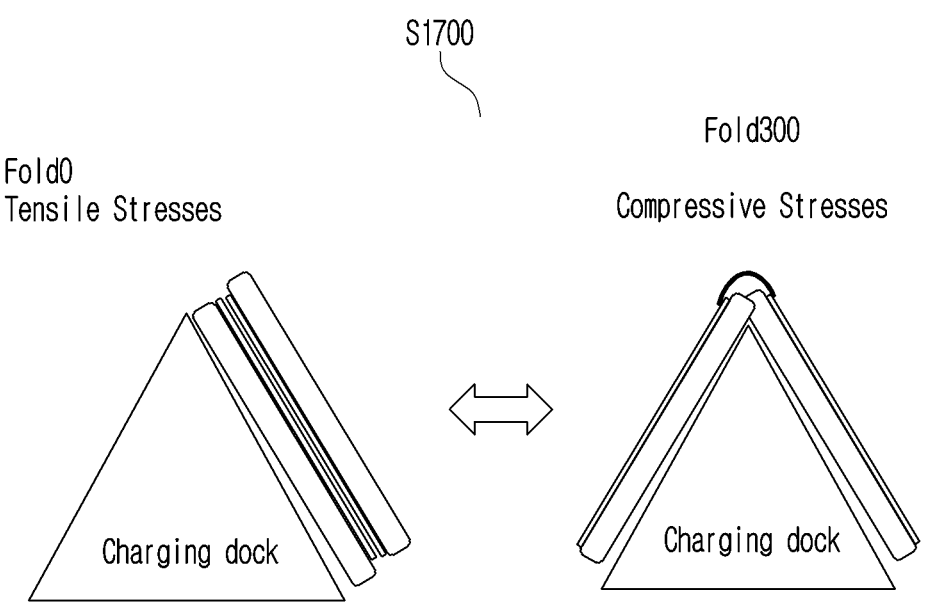
FIG. 17 is an example scenario in which a user may be alerted to use a foldable electronic device in an alternate folded state, when the foldable electronic device is in a charging Dock or a Dex mode, according to an embodiment of the disclosure.

FIG. 17 is an example scenario in which a user may be alerted to use a foldable electronic device in an alternate folded state, when the foldable electronic device is in a charging Dock or a Dex mode, according to an embodiment of the disclosure.

Referring to FIG. 17, in an example scenario S1700, the wireless charging dock may be configured to hold the phone in two folded state. The folded state could be such that the folded state help recover the damage caused by repeated folding. Based on the proposed method, the user may be alerted to use the foldable electronic device 100 in an alternate folded state. The alert can pop-up when the user charges the foldable electronic device 100 or the alert can pop-up during regular use as a suggestion. The method may be used to improve device health.

Figure 18:
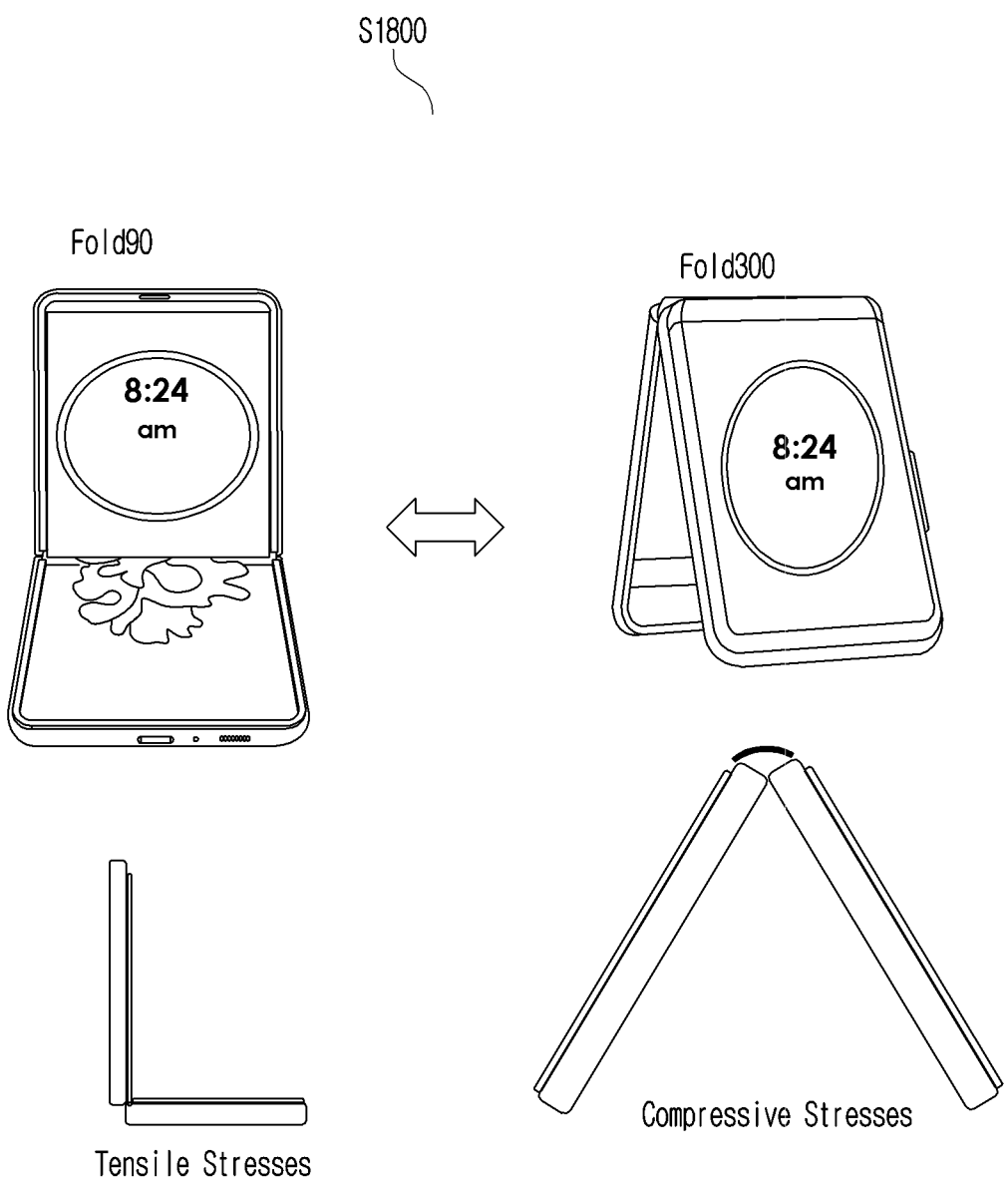
FIG. 18 is an example scenario in which a user may be alerted to use a foldable electronic device in an alternate folded state, when the foldable electronic device is in a clock mode, according to an embodiment of the disclosure.

FIG. 18 is an example scenario in which a user may be alerted to use a foldable electronic device in an alternate folded state, when the foldable electronic device is in a clock mode, according to an embodiment of the disclosure.

Referring to FIG. 18, an example scenario S1800, based on the proposed method, the user alerted to use the phone in Fold90 or Fold300 while setting the alarm based on current device health, so that the device health improves when going from Fold90 to Fold300 and sustained for long duration. The alert can also pops-up during regular use as a suggestion.

Figure 19:
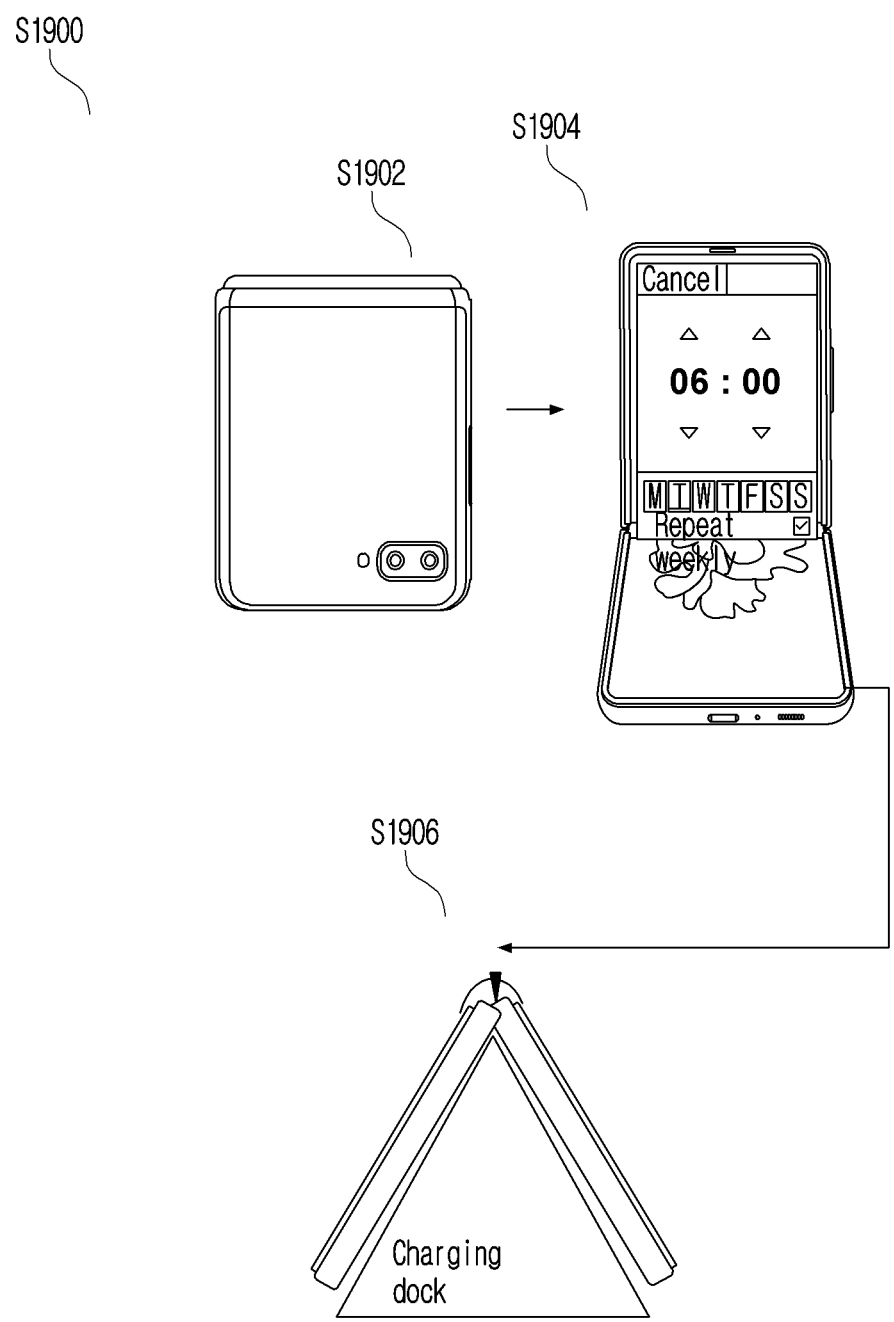
FIG. 19 is an example scenario in which a foldable electronic device actions and machine learning (ML) based recommendation on the foldable electronic device is explained, according to an embodiment of the disclosure.

FIG. 19 is an example scenario in which the foldable electronic device actions and ML based recommendation on a foldable electronic device is explained, according to an embodiment of the disclosure.

Referring to FIG. 19, in an example scenario S1900, at operation S1902, consider the foldable electronic device 100 is in the fully folded state Fold0 and the current device health is 70%. When the foldable device is opened to Fold90 at operation S1904 the device health gradually improves. If the device is set at operation S1904 for 2 hrs, the potential device health after 2 hrs may be calculated using the RNN model. Alternately, the user is recommended to set the device in Fold270 (not shown) state at operation S1908. The device health is expected to be better in Fold270 than in Fold90. Hence, the foldable electronic device 100 recommends the user to switch to Fold270 and computes improvement in health using RNN model and report the current health state at operation S1908.

Figure 20:
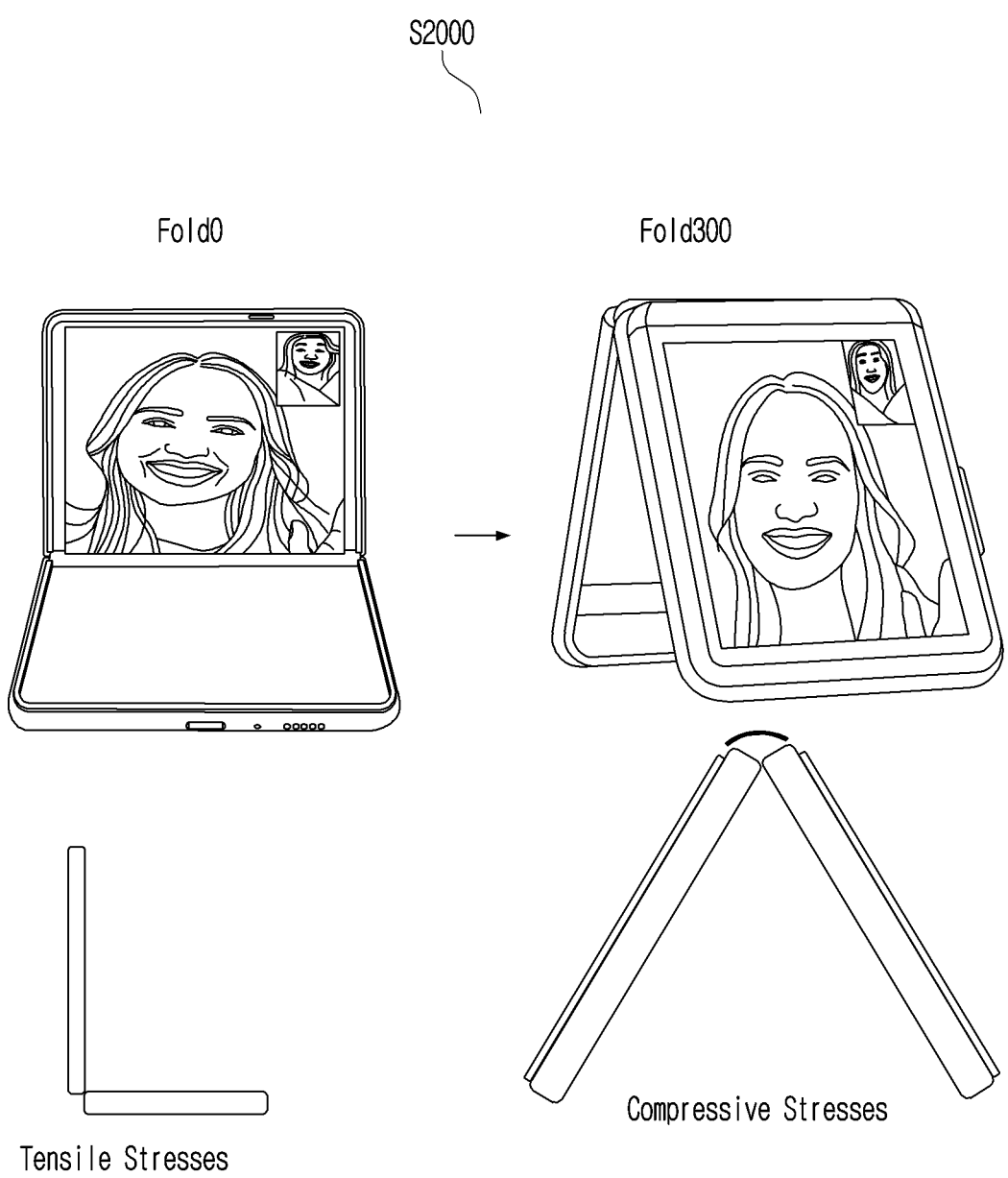
FIG. 20 is an example scenario in which a user may be alerted to use a foldable electronic device in an alternate folded state, when the foldable electronic device is in a video call mode, according to an embodiment of the disclosure.

FIG. 20 is an example scenario in which a user may be alerted to use a foldable electronic device in an alternate folded state, when the foldable electronic device is in a video call mode, according to an embodiment of the disclosure.

Referring to FIG. 20, in an example scenario S2000, the video calling may last for long durations so this may be an opportunity for the user to use the foldable electronic device 100 in the alternate folded configuration.

Figure 21:
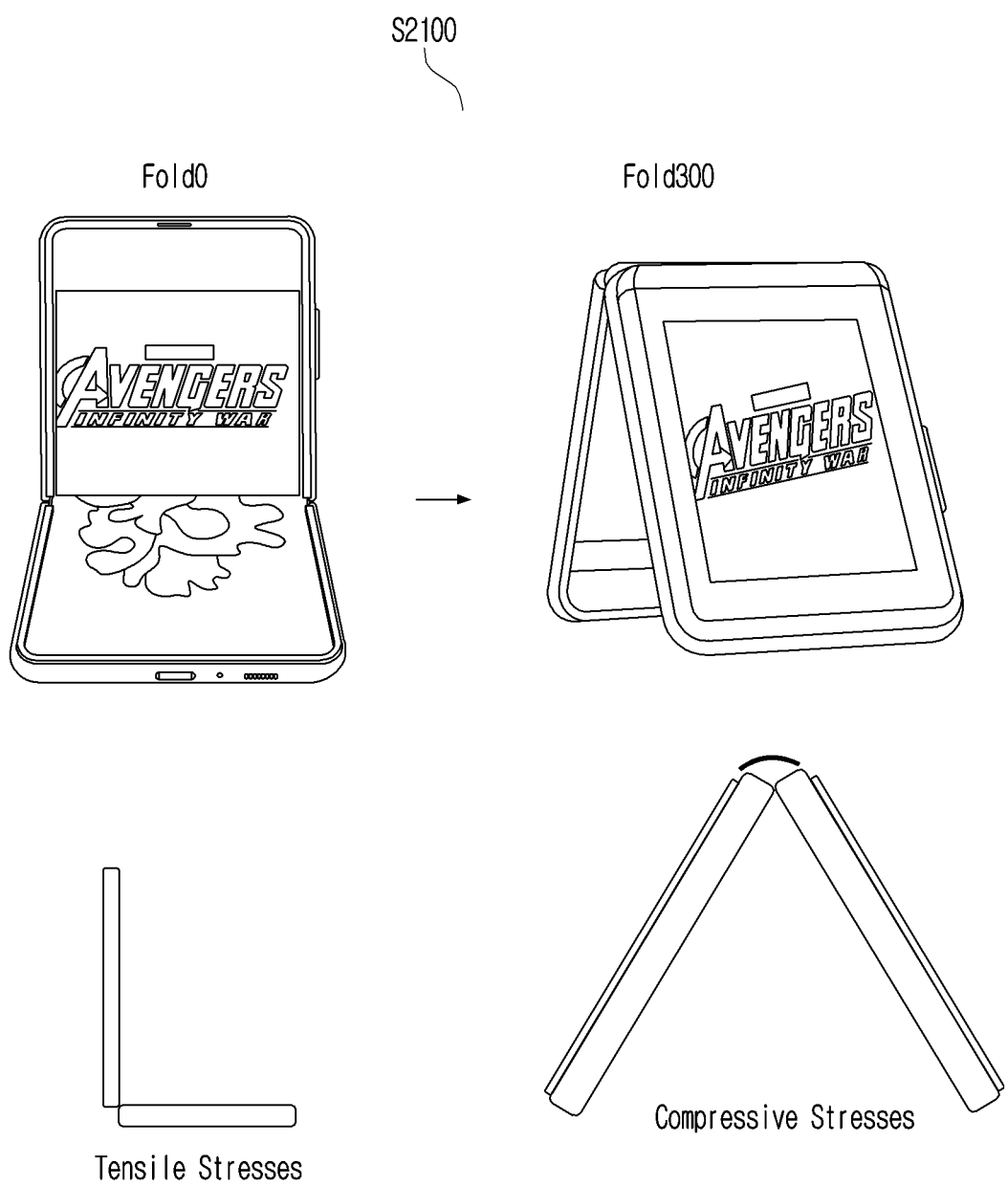
FIG. 21 is an example scenario in which a user may be alerted to use a foldable electronic device in an alternate folded state, when the foldable electronic device is in a movie streaming scenario, according to an embodiment of the disclosure.

FIG. 21 is an example scenario in which a user may be alerted to use a foldable electronic device in an alternate folded state, when the foldable electronic device is in a movie streaming scenario, according to an embodiment of the disclosure.

Referring to FIG. 21, in an example scenario S2100, the user is suggested to use the foldable electronic device 100 in the alternate folded configuration when the foldable electronic device 100 health drops.

Figure 22:
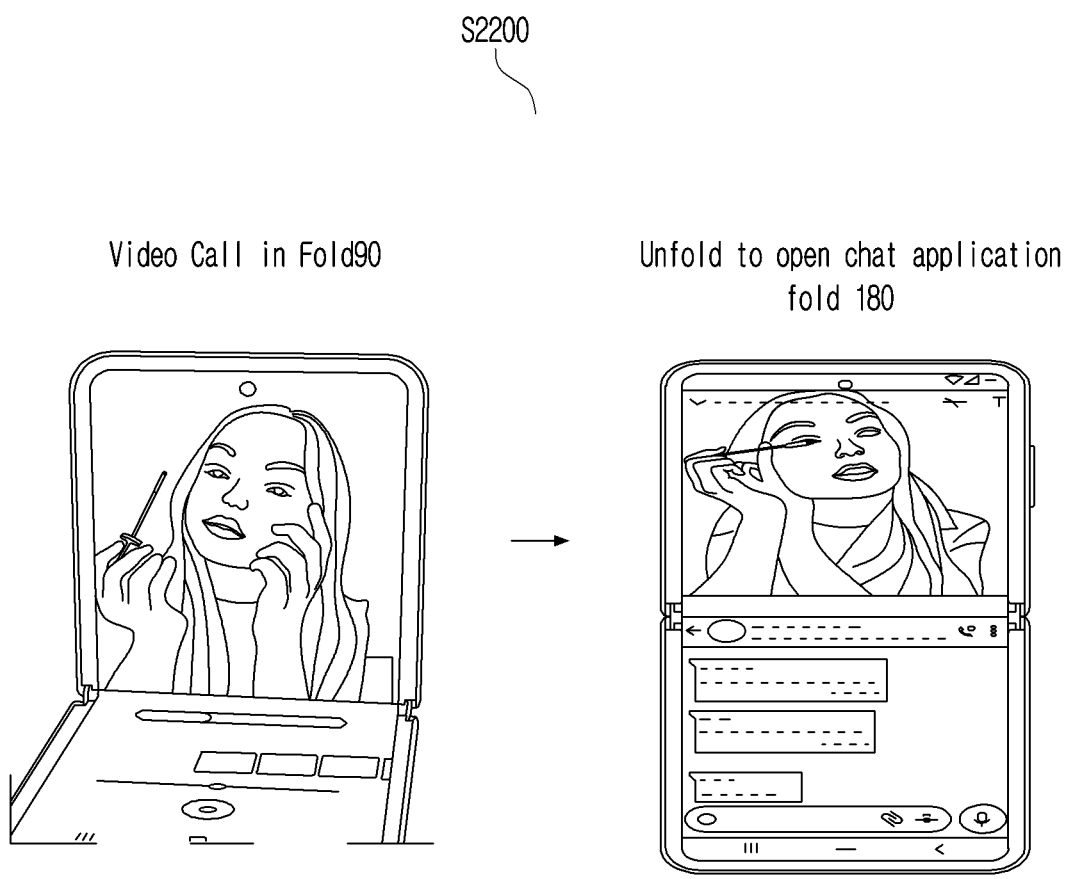
FIGS. 22 and 23 are example scenarios in which a user may be alerted to use a foldable electronic device in an alternate folded state, when the foldable electronic device performs multitasking across applications, according to various embodiments of the disclosure.
Figure 23:
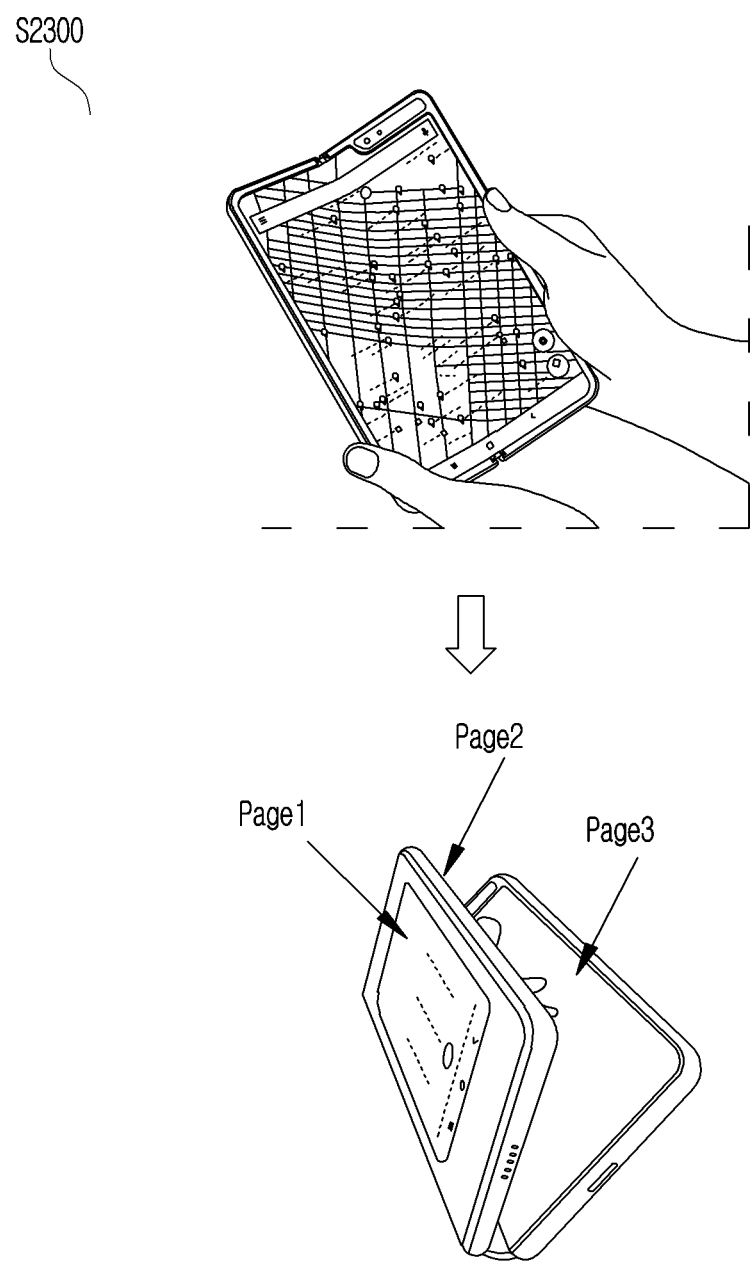

FIGS. 22 and 23 are example scenarios in which a user may be alerted to use a foldable electronic device in an alternate folded state, when the foldable electronic device performs the multitasking across the applications, according to various embodiments of the disclosure.

Referring to FIG. 22, in an example scenario S2200, the user can unfold the foldable electronic device 100 from Fold90 state to Fold180 to launch the application with a recent notification. This would give a split screen view and help sustain the Fold180 (stress free) state for longer.

Referring to FIG. 23, in an example scenario S2300, eBook user interface (UI) mimics a conventional book reading experience of flipping pages. The foldable electronic device 100 is folded inwards and outwards to flip through pages. The display assembly 140 goes through compression and tension alternately and therefore stress never adds up.

Based on the proposed method, the method may be used to switch between the applications or the application screens such that it recovers the damage due to prolonged use in one folded configuration.

Figure 24:
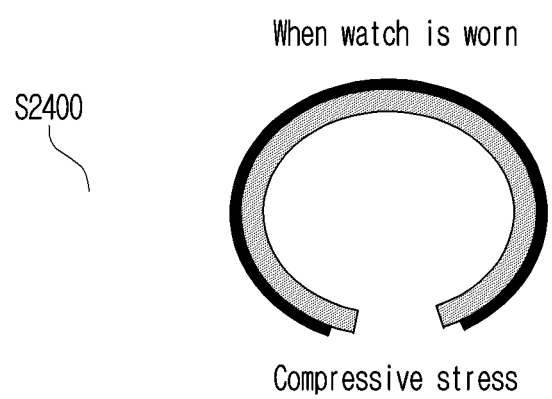
FIG. 24 is an example scenario (in which a user may be alerted to use wearables with flexible displays in an alternate folded state, according to an embodiment of the disclosure.
Figure 24:
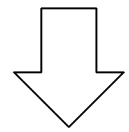
Figure 24:
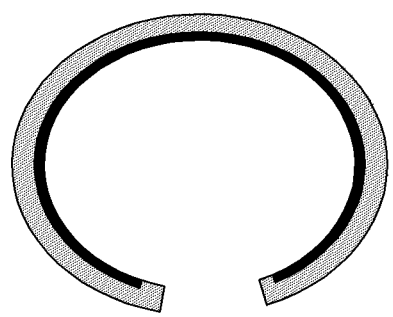

FIG. 24 is an example scenario in which a user may be alerted to use wearables with flexible displays in an alternate folded state, according to an embodiment of the disclosure.

Referring to FIG. 24, in an example scenario S2400, the foldable watch would have flexible display along the length of the strap and the display would see high stresses when the foldable watch is worn each time and this can lead to permanent damage over time. Based on the proposed method, the method may be used to use the ML model as used with foldable phones to monitor device health and suggest the user to use/store the device in the reverse configuration.

Based on the proposed method, the healing of the foldable electronic device 100 is achieved by folding the foldable electronic device 100 in an alternate fold angle without using additional hardware elements. The fold angle and duration is computed using a ML model and recommended to the user. This results in improving the user experience.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for determining a health of a display assembly of a foldable electronic device, the method comprising:
   detecting, by the foldable electronic device, a sequence of folds of the display assembly of the foldable electronic device;
   determining, by the foldable electronic device, a first plurality of parameters associated with the sequence of folds of the display assembly;
   determining, by the foldable electronic device, a second plurality of parameters associated with a concentrated load on the display assembly;
   determining, by the foldable electronic device, existing residual stress for the display assembly based on the first plurality of parameters and the second plurality of parameters;
   determining, by the foldable electronic device, the health of the display assembly based on the existing residual stress for the display assembly of the foldable electronic device;
   displaying, by the foldable electronic device, the health of the display assembly on the foldable electronic device; and
   recommending, by the foldable electronic device, a fold angle to a user of the foldable electronic device, wherein the fold angle is configured to reduce the existing residual stress of the display assembly.

2. The method as claimed in claim 1, wherein the first plurality of parameters comprises:
   an angle of each fold of the sequence of folds of the display assembly;
   a duration of each fold of the sequence of folds of the display assembly; and
   a direction of each fold of the sequence of folds of the display assembly.

3. The method as claimed in claim 1, wherein the second plurality of parameters comprises:
   a level of deformation in a thickness direction of the display assembly;
   a level of pressure on layers of the display assembly; and
   a reduction in gap between layers of the display assembly due to the concentrated load.

4. The method as claimed in claim 3, wherein the level of deformation in the thickness direction of the display assembly is determined by:
    determining a pressure load on the display assembly; and
    determining the level of deformation in the thickness direction of the display assembly based on the pressure load.

5. The method as claimed in claim 4,
    wherein the pressure load is one of a static pressure and a dynamic pressure,
    wherein the static pressure is caused due to a pressure from a stylus or a touch, and
    wherein the dynamic pressure caused from at least one of a gesture performed on the display assembly or an impact loading due to an object drop on the display assembly.

6. The method as claimed in claim 1, wherein the existing residual stress for the display assembly is determined by applying at least one machine learning model on a plurality of parameters associated with the sequence of folds or a plurality of parameters associated with the concentrated load on the display assembly.

7. The method as claimed in claim 6, wherein the method comprises training, by the foldable electronic device, the machine learning model by:
    obtaining the plurality of parameters associated with the sequence of folds and the plurality of parameters associated with the concentrated load on the display assembly by a user of the foldable electronic device;
    determining the plurality of parameters of the display assembly of the sequence of folds and the concentrated load on the display assembly by the user; and
    training the machine learning model using the plurality of parameters of the display assembly of the sequence of folds and the concentrated load.

8. The method as claimed in claim 2, wherein the angle of each fold of the sequence of folds of the display assembly is determined using at least one of an inertial measurement unit (IMU) sensor, a flex sensor, or a Hall sensor.

9. The method as claimed in claim 3, wherein determining the level of deformation in the thickness direction of the display assembly comprises:
    measuring a deflection of the display assembly based on at least one of a finger touch, a stylus, or an object drop using at least one capacitance sensor placed in a fold region of the foldable electronic device; and
    detecting an area of the deflection of the display assembly and a duration of the deflection of the display assembly based on the deflection of the display assembly.

10. A foldable electronic device for determining a health of a display assembly of the foldable electronic device, the foldable electronic device comprises:
    the display assembly;
    a memory storing folding information of the display assembly;
    a processor connected to the memory; and
    a health status controller, connected to the memory and the processor, the health status controller configured to:
        detect a sequence of folds of the display assembly of the foldable electronic device,
        determine a first plurality of parameters associated with the sequence of folds of the display assembly,
        determine a second plurality of parameters associated with a concentrated load on the display assembly,
        determine existing residual stress for the display assembly based on the first plurality of parameters and the second plurality of parameters,
        determine the health of the display assembly based on the existing residual stress for the display assembly of the foldable electronic device,
        display the health of the display assembly on the foldable electronic device, and
        recommend a fold angle to a user of the foldable electronic device, wherein the fold angle is configured to reduce the existing residual stress of the display assembly.

11. The foldable electronic device as claimed in claim 10, wherein the first plurality of parameters associated with the display assembly comprises:
    an angle of the sequence of folds of the display assembly;
    a duration of the sequence of folds of the display assembly; and
    a direction of the sequence of folds of the display assembly.

12. The foldable electronic device as claimed in claim 10, wherein the second plurality of parameters comprises:
    a level of deformation in a thickness direction of the display assembly;
    a level of pressure on layers of the display assembly; and
    a reduction in gap between layers of the display assembly due to the concentrated load.

13. The foldable electronic device as claimed in claim 12, wherein the level of deformation in the thickness direction of the display assembly is determined by:
    determining a pressure load on the display assembly; and
    determining the level of deformation in the thickness direction of the display assembly based on the pressure load.

14. The foldable electronic device of claim 11,
    wherein the existing residual stress accumulates after every fold in a 1-way foldable electronic device, and
    wherein the existing residual stress is reduced for a 2-way foldable electronic device with a change in fold direction.

15. The foldable electronic device of claim 14, wherein the existing residual stress gradually decreases as a length of an unfolded state of the foldable electronic device increases.

16. The foldable electronic device of claim 11, wherein the existing residual stress is determined using a recurrent neural network (RNN) model.

17. The method as claimed in claim 1, wherein a location of a fold for the recommended fold angle is always a same location.

18. The method as claimed in claim 1, wherein the recommendation is displayed to the user during charging so that the charging may be performed with the foldable electronic device at the recommended fold angle.

* * * * *